ions and solutions of sodium chromate ($Na_2CrO_4 \cdot 4H_2O$) and sodium tripolyphosphate ($Na_5P_3O_{10}$). As a specific example, the following formula is illustrative of a preferred corrosion inhibitor composition within the purview of the present invention, but it is not intended to limit the invention thereto:

2,728,652
CORROSION INHIBITOR COMPOSITION

Francis E. Hance, Honolulu, Territory of Hawaii, assignor, by mesne assignments, to Hawaiian Development Company, Ltd., Honolulu, Territory of Hawaii, a corporation of the Territory of Hawaii No Drawing. Application November 10, 1952,
Serial No. 319,822

8 Claims. (Cl. 71—2.4)

This invention relates to corrosion inhibitors and has particular reference to corrosion inhibitor compositions adapted to be utilized in the prevention of corrosion of metallic bodies.

One of the principal objects of this invention is to provide corrosion inhibitor compositions effective in preventing pitting and corrosion of metallic bodies by the action of corrosive chemicals.

Another object of this invention is to provide corrosion inhibitor compositions which are particularly effective in preventing corrosion of metallic bodies in contact with sodium trichloroacetate, phenyl mercuric acetate and other corrosive herbicide chemicals.

Another object of this invention is to provide compositions effective in preventing or inhibiting the action of corrosive materials upon metal bodies, and further effective in preventing the reduction to metallic mercury of fungicidal solutions of mercurials in steel containers.

Yet another object of this invention is to provide corrosion inhibitor compositions which are inexpensive and easily prepared in the field.

Other objects and advantages of this invention it is believed will be readily apparent from the following detailed description of preferred embodiments thereof:

Briefly, compositions of this invention include mixtures and solutions of sodium chromate ($Na_2CrO_4 \cdot 4H_2O$) and sodium tripolyphosphate ($Na_5P_3O_{10}$). As a specific example, the following formula is illustrative of a preferred corrosion inhibitor composition within the purview of the present invention, but it is not intended to limit the invention thereto:

Example 1:

| | Pounds |
|---|---|
| Sodium tripolyphosphate, anhydrous | 0.5 |
| Sodium chromate | 2.0 |

In order to provide a product which is convenient to handle and easy to use, the ingredients of the above example are dissolved in water, preferably in an amount sufficient to make a total volume of approximately one gallon.

Compositions of the type disclosed above have been found particularly suitable for use as a corrosion inhibitor in solutions of sodium trichloroacetate, phenyl mercuric acetate and other herbicidal or fungicidal solutions. Preferably, about 1 per cent by volume of the inhibitor solution is added to the herbicidal or fungicidal solution, and solutions so prepared may be prepared and stored in, or in contact with, steel, iron, aluminum, copper, zinc, cadmium or other metal equipment without inducing corrosion of the metal. A specific example of such a concentrated herbicidal solution is as follows:

Example 2:

| | |
|---|---|
| Sodium trichloroacetate (90%) pounds | 22 |
| Water to make a total volume of 100 gallons. | |
| Inhibitor gallons | 1 |

Solutions of the type disclosed in Example 2 may remain in contact with substantially any metal equipment for several days without inducing corrosion or showing evidence of galvanic action or electrolytic coupling. In the field, the solution of Example 2 is diluted to about 1,000 gallons for application to Bermuda or other grasses and is highly effective at this concentration. No additional inhibitor is required so long as the diluted stock solution is applied during the day of its dilution. In the event the diluted solution is to be stored in metal containers for several days or weeks, additional inhibitor is added as needed.

Corrosion inhibitor compositions of this invention are highly advantageous in that the addition of sodium tripolyphosphate to a sodium chromate solution enables the use of less of the more costly chromate per unit volume of inhibited solution. Additionally, the sodium tripolyphosphate cooperates with the sodium chromate in sequestering and holding in solution most or all of the normal corrosion residues and dross found on all metals subject to exposure, and thus insures a liquid which is clear and free from precipitates or suspended matter which might clog equipment such as spray nozzles and the like. Possibly more important, however, is the fact that the presence of the sodium tripolyphosphate in the inhibitor composition provides means for inhibiting the initial and progressive stages of galvanic action in the event that two or more dissimilar metals are in contact in the container holding the inhibitor-treated solution.

Another important feature of the corrosion inhibitor compositions of this invention resides in the fact that sodium tripolyphosphate, together with the chromate, functions, in sodium trichloroacetate solutions, as a buffering agent and prevents the occurrence of the chemical reaction which ordinarily takes place when uninhibited sodium trichloroacetate solutions are brought into contact with metals, or are stored in metallic containers. By its buffering action the sodium tripolyphosphate maintains the original alkalinity of the sodium trichloroacetate solution and enables preparation of the solution with other herbicides without causing precipitation of the added chemicals.

Corrosion inhibitor compositions of this invention are equally effective in preventing the reduction to metallic mercury of fungicidal solutions contained in steel containers.

The above description and examples are intended to be illustrative only. Any modification of or variation therefrom which conforms to the spirit of the invention is intended to be included within the scope of the claims.

I claim:

1. A corrosion inhibitor composition comprising: sodium tripolyphosphate, and sodium chromate.

2. A corrosion inhibitor composition comprising: an aqueous solution of sodium tripolyphosphate, and sodium chromate.

3. A corrosion inhibitor composition comprising: approximately one part sodium tripolyphosphate, and approximately four parts sodium chromate.

4. A corrosion inhibitor composition comprising: an aqueous solution of approximately one part sodium tripolyphosphate, and approximately four parts sodium chromate.

5. A herbicidal solution including about 1 per cent by volume of an aqueous solution of sodium tripolyphosphate and sodium chromate.

6. A herbicidal solution including about 1 per cent by volume of an aqueous solution of approximately one part sodium tripolyphosphate, and approximately four parts sodium chromate.

7. A herbicidal solution including sodium trichloroacetate, and about 1 percent by volume of an aqueous solution of sodium tripolyphosphate and sodium chromate.

8. A herbicidal solution including sodium trichloroacetate, and about 1 per cent by volume of an aqueous solution of approximately one part sodium tripolyphosphate and approximately four parts sodium chromate.

References Cited in the file of this patent
UNITED STATES PATENTS 2,554,972     Alquist et al. _____ May 29, 1921